US005861818A

United States Patent [19]

Ohtsuki

[11] Patent Number: 5,861,818

[45] Date of Patent: Jan. 19, 1999

[54] RADIO PAGING SELECTIVE RECEIVER WITH DISPLAY FOR NOTIFYING PRESENCE OF UNREAD MESSAGE BASED ON TIME OF RECEIPT

[75] Inventor: Michihito Ohtsuki, Tokyo, Japan

[73] Assignee: NEC Corporation, Tokyo, Japan

[21] Appl. No.: 645,257

[22] Filed: May 13, 1996

[30] Foreign Application Priority Data

May 17, 1995 [JP] Japan .................................... 7-117583

[51] Int. Cl.[6] ........................................................ H04Q 7/18

[52] U.S. Cl. .................................. 340/825.44; 340/311.1; 455/38.4; 455/517; 455/140; 370/312; 370/313; 368/10; 368/109; 968/844

[58] Field of Search ......................... 340/825.44, 825.69, 340/311.1, 825.47, 825.52; 455/458, 31.1, 432, 426, 38.4, 140, 526, 517, 575, 422; 368/242, 10, 107, 251, 108, 109; 968/844; 370/310, 313, 312, 314

[56] References Cited

U.S. PATENT DOCUMENTS

| | | | |
|---|---|---|---|
| 4,385,295 | 5/1983 | Willard et al. | 340/825.44 |
| 4,872,005 | 10/1989 | DeLuca et al. | 340/825.44 |
| 5,140,561 | 8/1992 | Miyashita et al. | 340/825.44 X |
| 5,264,841 | 11/1993 | Wagai et al. | 340/825.44 |
| 5,396,229 | 3/1995 | Miyauchi | 340/825.44 X |
| 5,436,620 | 7/1995 | Ide | 340/825.44 |
| 5,461,663 | 10/1995 | Motegi | 340/825.44 |
| 5,625,351 | 4/1997 | Willard et al. | 340/825.44 X |

FOREIGN PATENT DOCUMENTS

| | | |
|---|---|---|
| 4-29424 | 1/1992 | Japan . |

*Primary Examiner*—Brian Zimmerman
*Assistant Examiner*—William H. Wilson, Jr.
*Attorney, Agent, or Firm*—Scully, Scott, Murphy and Presser

[57] ABSTRACT

A radio paging selective receiver determines that a received message is unread based on the time difference between the message reception time and the current time being larger that some predetermined value of time, and the paging selective receiver provides an indication of the unread message by displaying the reception time of the unread message in a second fashion which is visibly different from a first fashion normally used to display the current time.

5 Claims, 3 Drawing Sheets

RADIO PAGING SELECTIVE RECEIVER WITH DISPLAY FOR NOTIFYING PRESENCE OF UNREAD MESSAGE BASED ON TIME OF RECEIPT

BACKGROUND OF THE INVENTION

The present invention generally relates to a radio paging selective receiver (hereafter sometimes "pager") with a display function, and particularly, to a pager including a memory for storing a received message and a display for displaying a read message from the memory and notifying a presence of an unread message in the memory.

DESCRIPTION OF THE RELATED ART

A typical pager with a display function has a memory for storing a received message and a display for displaying the message, as it is read from the memory by an intended operation of a carrying person.

Such the pager is implemented to be responsive to a reception of the message, for notifying the carrying person of the reception of message in a various manner, e.g. by vibrations of a vibrator, sounds from a speaker and information on a light emitting diode (hereafter "LED").

The carrying person may incidentally be unaware of the notification of reception so that the stored message may be left as it is unread.

In consideration of such the case, the Japanese Patent Application Laid-Open Publication No. 4-29424 has disclosed a pager with a display function, in which a periodical clock alarm was given by using a particular beep frequency or display pattern different from a normal beep frequency or display pattern to notify a carrying person of a presence of an unread message.

Therefore, unless the clock alarm function was set on, the function of notifying the presence of unread message remained ineffective until the carrying person performs a power-on operation or a message display operation.

Still less, even if the notifying function was effective, the clock alarm was no more than for a current time so that the carrying person could not know the time at which the unread message had been received.

The present invention has been achieved with such points in mind.

SUMMARY OF THE INVENTION

It therefore is an object of the present invention to provide a radio paging selective receiver with a display function permitting both a presence and a reception time of an unread message to be notified irrespective of whether a clock alarm function is set on or not.

To achieve the object, a genus of the present invention provides a radio paging selective receiver comprising clock means for defining a current time, radio means for receiving a transmitted signal to provide a received signal, signal processing means for processing the received signal to provide a received message, the signal processing means being cooperative with the clock means to define a reception time of the received message and a time difference between the reception time and the current time, memory means for storing the received message and the reception time, display means for displaying the current time in a first fashion, the display means being cooperative with the signal processing means for displaying the received message, as it is read from the memory means, decision means responsive to a larger value of the time difference than a predetermined value for concluding that the received message is an unread message, and control means responsive to a presence of the unread message for controlling the display means to display the reception time, as it is read from the memory means, in a second fashion different from the first fashion.

According to the genus of the invention, a current time is displayed in a normal fashion on a display which is operative for displaying a received message, as it is read from a memory, and which is controllable to display in a different fashion from the normal fashion a reception time of a received message that has been stored in the memory, without being read, for a longer time than predetermined.

Therefore, a radio paging selective receiver with a display function is permitted to notify both a presence and a reception time of an unread message irrespective of whether a clock alarm function is set on or not.

According to a species of the genus of the present invention, the displayed reception time flickers in the second fashion.

According to another species of the genus of the invention, the display means in the second fashion has an inverted brightness with respect to the first fashion.

According to another species of the genus of the invention, the radio paging selective receiver further comprises beep means for beeping out a reception of the received message for a time interval equivalent to said predetermined value.

According to another species of the genus of the invention, the radio paging selective receiver further comprises detection means responsive to the received signal for detecting a communicatable zone of the radio paging selective receiver to provide a detection signal, and the control means is responsible for the detection signal to be respond to the presence of the unread message for controlling the display means to display the reception time.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

There will be detailed below an embodiment of the invention with reference to the accompanying drawings.

Figure 1:
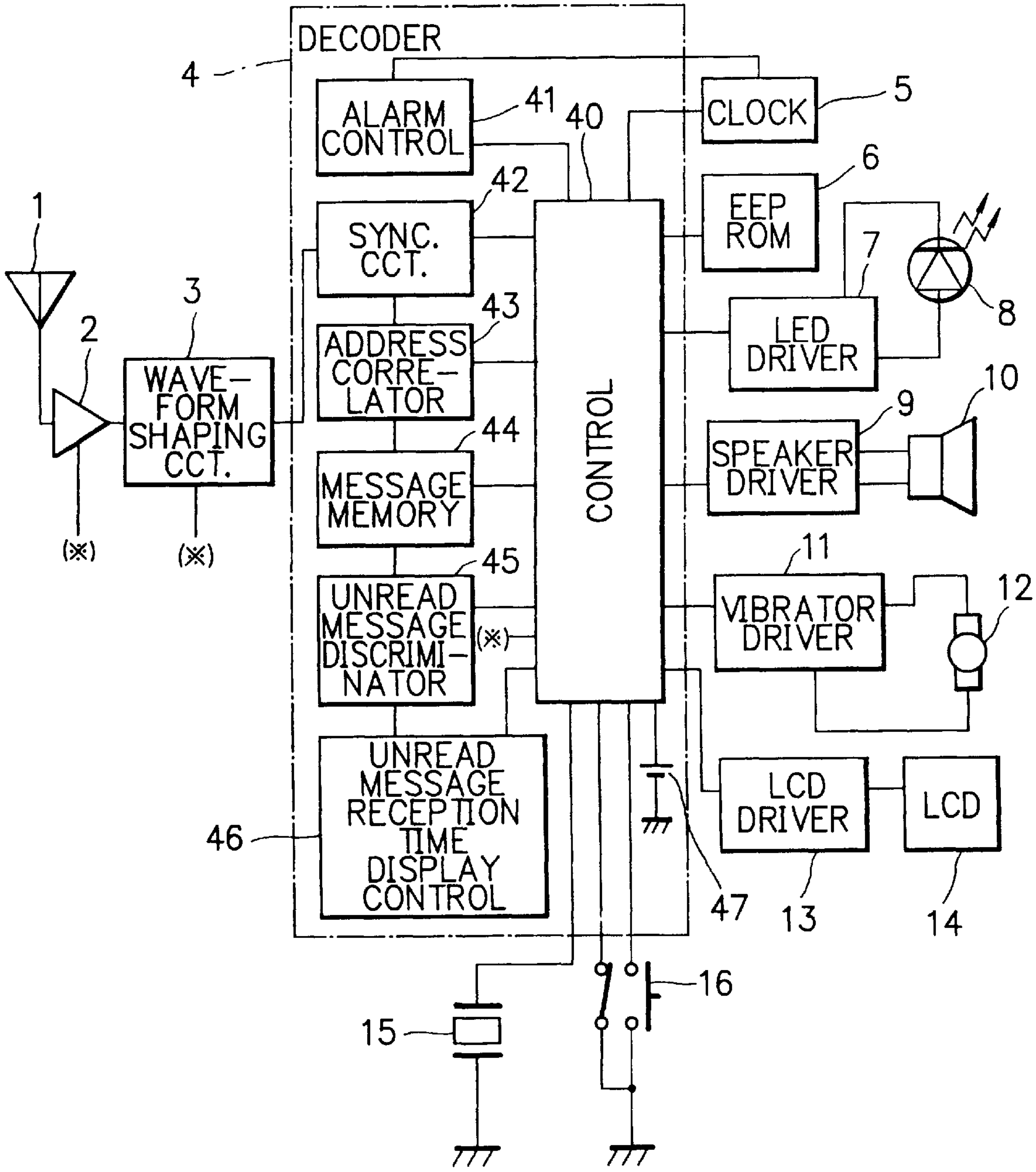
FIG. 1 is a block diagram of a pager with a display function according to an embodiment of the invention.

FIG. 1 shows a block diagram of a pager with a display function according to an embodiment of the invention.

The pager of FIG. 1 comrises an antenna 1, a radio section 2 connected to the antenna 1, a waveform shaping circuit 3 connected to the radio section 2, and a decoder 4 connected to the radio section 3.

The decoder 4 includes an alarm controller 41, a synchronization circuit 42 connected to the waveform shaping circuit 3, an address correlator 43 connected to the synchronization circuit 42, a message memory 44 connected to the address correlator 43, an unread message discriminator 45 connected to the message memory 44, an unread message reception time display controller 46 connected to the unread message discriminator 45, and a power distributable paging controller 40 connected to the respective components 41 to 46 of the decoder 4 and the radio section 2 and waveform shaping circuit 3.

The pager of FIG. 1 further comprises a clock circuit 5 connected to the alarm controller 41 and the paging controller 40, an electrically erasable programmable read only memory (hereafter "EEPROM") 6 connected to the paging controller 40, an LED driver 7 controlled by the paging controller 40 for driving an LED 8, a speaker driver 9 controlled by the paging controller 40 for driving a speaker 10, a vibrator driver 11 controlled by the paging controller 40 for driving a vibrator 12, a liquid crystal display (hereafter "LCD") driver 13 controlled by the paging controller 40 for driving an LCD 14, a quartz oscillator 15 for supplying a reference clock to the paging controller 40, and a pushbutton switch 16 connected to the paging controller 40.

In the pager of FIG. 1, a transmitted radio signal is received by the antenna 1 and input therefrom to the radio section 2, where it is amplified and demodulated to be input to the waveform shaping circuit 3, where it is converted into a digital signal as a sequence of bits to be processed in the decoder 4.

The digital signal is input to the synchronization circuit 42, which is operative in synchronizm with the reference clock for clocking out a destination address part of the digital signal to the address correlator 43, where it is correlated with an own address of the pager that has been written in the EEPROM 6 and is read therefrom.

If the correlator 43 detects a match between the destination and own addresses, then a memory region designation signal is sent therefrom to the message memory 44, and a subsequent message part of the digital signal is clocked out as a received message from the synchronization circuit 42 to the paging controller 40, when a current time is input from the clock circuit 5 to the paging controller 40, where it is recognized as a reception time of the received message.

The received message and the reception time are stored in a designated region of the message memory 44.

Upon completion of such signal receiving actions, the paging controller 40 outputs effective or ineffective control signals to the LED driver 7, speaker driver 9 and vibrator driver 11, as required for causing the LED 8 to blink, the speaker 10 to beep and/or the vibrator 12 to vibrate, thereby notifying a carrying person of a reception of the message to the own pager.

The carrying person ordinarily responds to such reception notification, by operating the pushbutton switch 16 to have the paging controller 40 read the received message and the reception time from the message memory 44 and control the LCD driver 13 so that the LCD 14 displays the read message and reception time.

Concurrently with the switch operation, the reception notifying actions of the LED 8, speaker 10 and/or vibrator 12 are stopped.

Unless the pushbutton switch 16 is operated, the reception notifying actions are repeated for a predetermined time (10 sec to 15 sec), i.e. until a time difference between the reception time and the current time exceeds a preset value.

The pushbutton switch 16 is employable to generate a combination or sequence of on-off signals for voluntarily setting up a paging mode of the pager, an updated current time of the clock circuit 5, and a power saving mode for keeping a pager battery 47 at a minimum rate of power consumption by holding alive at least the quartz oscillator 15, pushbutton switch 16, clock circuit 5, LCD driver 13, LCD 14 and part of internal circuits of the paging controller 40 for backing up necessary members to permit a resetting to the paging mode.

The paging mode may permit the notification of message reception to be effected by a voluntary combination of a blinking of the LED 8, a beeping of the speaker 10 and/or vibrations of the vibrator 12.

Figure 3:
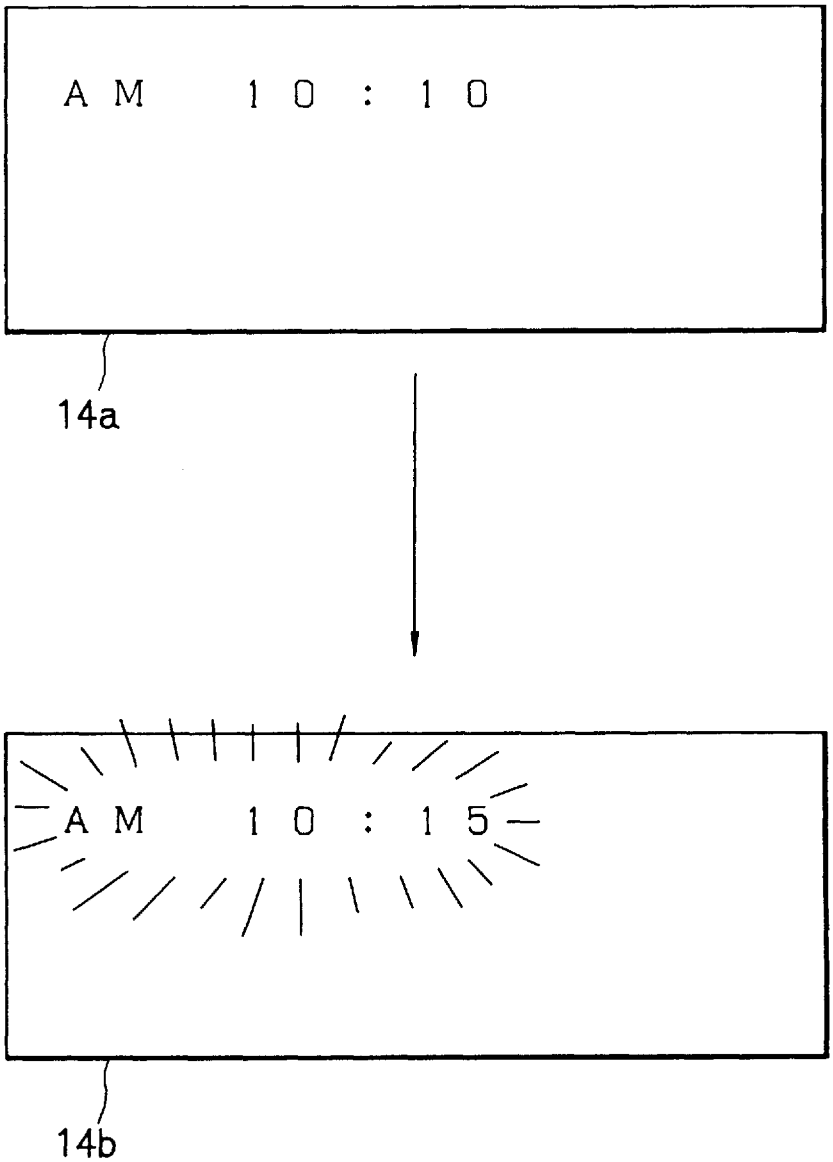
FIG. 3 is an illustration of a current time and a reception time, as they are displayed on the pager of FIG. 1 in different fashions from each other.

The LCD driver 13 is always controlled by the paging controller 40 so that the LCD 14 normally displays a current time defined by the clock circuit 5, in a normal fashion 14*a* (FIG. 3) in which the time is displayed in black on a blank white (silver) base, without flickering.

The paging controller 40 supervises a working state of each associated circuit.

When the time difference between the reception time and the current time has reached the preset value, the unread message discriminator 45 is controlled to check if the stored message in the message memory 44 have been read together with the reception time thereof. In the case the stored message has been read, a read flag is set therefor.

If the stored message has not yet been read from the message memory 44, the discriminator 45 sets an unread flag on the message and outputs an unread message detection signal to the unread message reception time display controller 46, which responds thereto to output a reception time display control signal to the paging controller 40.

The paging controller 40 is responsive to the reception time display control signal, for reading from the message memory 44 the reception time of the stored message that has the unread flag set thereon and for contolling the LCD driver 13 so that the LCD stops displaying the current time and starts displaying the read reception time at the same place in a particular fashion 14*b* (FIG. 3) in which the time is displayed in white (silver) on a reversed (black) blank base in a flickering manner, with an increased tendency to inform the carrying person of the reception of message. i.e., of a presence of the unread message.

The paging controller 40 enters the power saving mode when the pushbutton switch 16 is so operated or if the radio section 2 (or the synchronizing circuit 42) is kept static for a predetermined time without receiving a transmitted signal from an associated paging network, such as when the carrying person has gone out of a communicatable zone of the paging network.

In the power saving mode, at least both the unread message discriminator 45 and the unread message reception time display controller 46 are kept off so that the LCD 14 does not display the reception time of unread message.

The power saving mode can be manually reset to the paging mode by operating the pushbutton switch 16, or may be automatically reset thereto when the radio section 2 receives a transmitted signal from the paging network, as the signal includes a network identifier, or when the synchronizing circuit 42 receives a digital signal from the waveform shaping circuit 3, or alternatively when the address correlator 43 detects a match between destination and own addresses.

The circuit members 41, 43, 45 and 46 may each comprise a program file to be read and executed by the paging controller 40.

There will be described a basic paging mode of the pager of FIG. 1.

Figure 2:
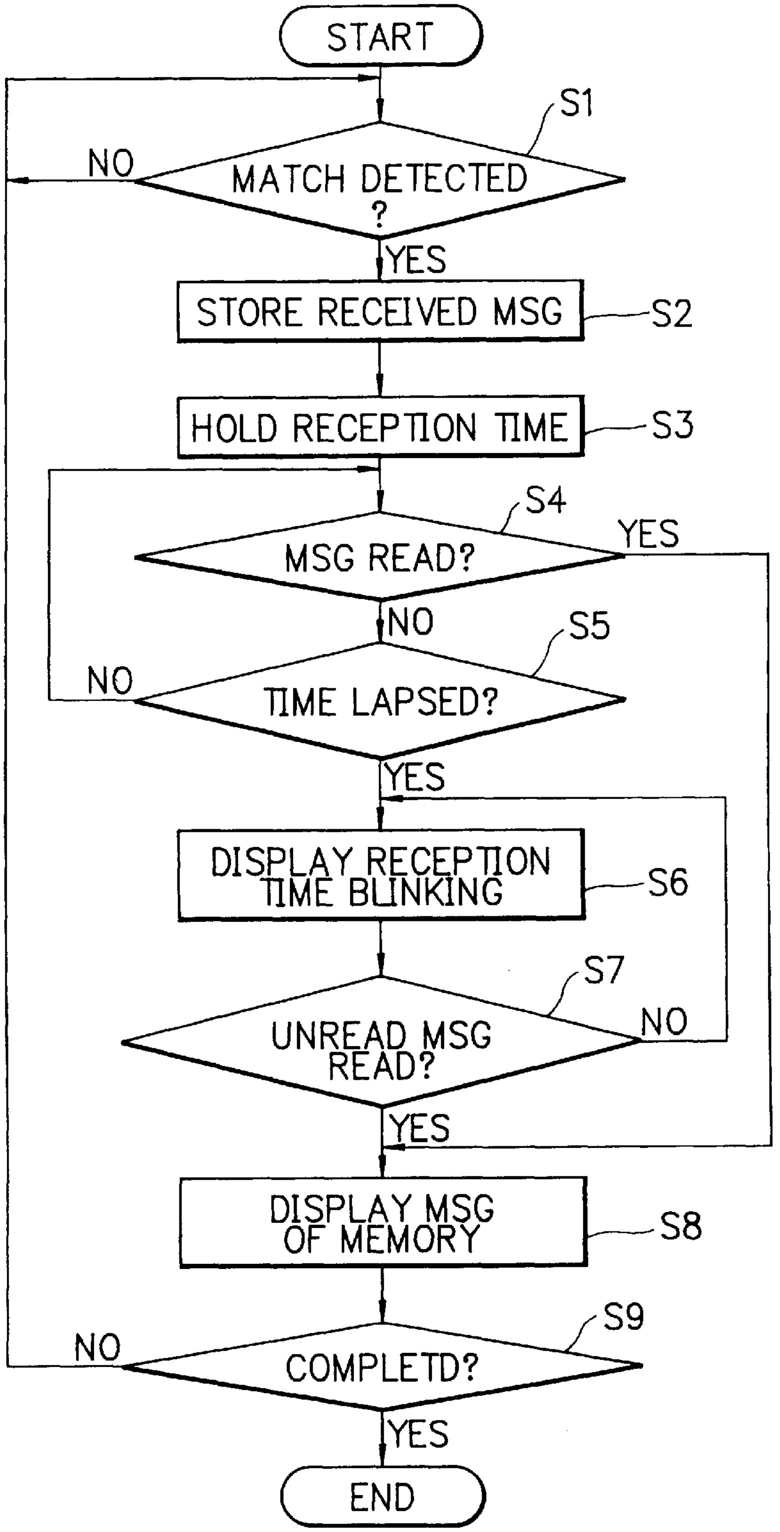
FIG. 2 is a flow chart of actions of the pager of FIG. 1.

FIG. 2 shows a flow chart of actions of the pager.

At a step S1 a radio signal received by the antenna 1 is input to the decoder 4 via the radio section 2 and the waveform shaping circuit 3.

The address correlator 43 correlates a destination address of the input signal with an own address of the pager. If a match is detected therebetween, the flow goes to a subsequent step S2.

At the step 2, a message is received by the paging controller 40, which concurrently receives a current time from the clock circuit 5, as a reception time of the received message.

The received message is stored in the message memory 44.

At a step S3, the reception time also is stored in the same memory region as the received message.

Concurrently, the paging controller 40 outputs effective or ineffective control signals to the LED driver 7, speaker driver 9 and vibrator driver 11, as required for causing the LED 8 to blink, the speaker 10 to beep and/or the vibrator 12 to vibrate in accordance with a setting of the paging mode, notifying a carrying person of the reception of the message.

The carrying person may operate the pushbutton switch 16 to have the paging controller 40 read the received message and the reception time from the message memory 44.

Concurrently with the switch operation, the reception notifying actions of the LED 8, speaker 10 and/or vibrator 12 are stopped.

At a step S4, it is checked if the stored message is read.

If the pushbutton switch 16 is operated, it is concluded that the message is read, so the flow goes to a step S8, where the LCD driver 13 is controlled so that the LCD 14 displays the read message and reception time.

In the case the switch 16 is not operated it is concluded that the message is not read, so the flow goes to a step S5.

The step S5 checks if a predetermined time has lapsed after the reception of message, i.e., if the time difference between the reception time and a current time is larger than a preset value.

If the predetermined time has lapsed, the stored message is deemed as an unread message, so the flow goes to a step S6, where the LCD driver 13 is controlled so that the LCD displays the reception time of the unread message in a flickering manner, as described.

The reception time of the unread message keeps flickering, until the pushbutton switch 16 is operated to display the unread message together with the reception time.

Unless the predetermined time has lapsed at the step S5, the flow to the step S4.

At a step S7, it is checked if the unread message is read.

In the case the unread message is read, the flow goes to the step S8.

Unless the unread message is read at the step S7 the flow goes to the step S6.

A step S9 checks if a preset paging process is completed.

If it is completed, the flow goes to an end. It it is not, the flow goes to the step S1.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio paging selective receiver comprising:

clock means for defining a current time;

radio means for receiving a transmitted signal to provide a received signal;

signal processing means for processing the received signal to provide a received message, the signal processing means being cooperative with the clock means to define a reception time of the received message and a time difference between the reception time and the current time;

memory means for storing the received message and the reception time;

display means for normally displaying the current time in a first fashion, the display means being cooperative with the signal processing means for displaying the received message, as it is read from the memory means;

decision means, responsive to a value of the time difference between the reception time and the current time being larger than a predetermined value, for concluding that the received message is an unread message; and control means responsive to a presence of the unread message for controlling the display means to display the reception time of the unread message, as it is read from the memory means, in a second fashion which is visibly different from the first fashion.

2. A radio paging selective receiver according to claim 1, wherein the displayed reception time flickers in the second fashion.

3. A radio paging selective receiver according to claim 1, wherein the display means in the second fashion has an inverted brightness with respect to the first fashion.

4. A radio paging selective receiver according to claim 1, further comprising beep means for beeping out a reception of the received message for a time interval equivalent to said predetermined value.

5. A radio paging selective receiver according to claim 1, further comprising:

detection means responsive to the received signal for detecting a communicatable zone of the radio paging selective receiver to provide a detection signal; and the control means is responsive to the detection signal to respond to the presence of the unread message for controlling the display means to display the reception time.

* * * * *

UNITED STATES PATENT AND TRADEMARK OFFICE

CERTIFICATE OF CORRECTION

PATENT NO. : 5,861,818

DATED : January 19, 1999

INVENTOR(S) : Michihito Ohtsuki

It is certified that error appears in the above-identified patent and that said Letters Patent is hereby corrected as shown below:

Column 2, Line 59: "comrises" should read --comprises--

Column 6, Line 2: "It" should read --If--

Signed and Sealed this

Twenty-third Day of January, 2001

*Attest:*

Q. TODD DICKINSON

*Attesting Officer*

*Commissioner of Patents and Trademarks*